US009359116B2

(12) United States Patent
Beranger et al.

(10) Patent No.: US 9,359,116 B2
(45) Date of Patent: Jun. 7, 2016

(54) FLUID DISPENSER MEMBER

(71) Applicant: APTAR FRANCE S.A.S., Le Neubourg (FR)

(72) Inventors: Stephane Beranger, Surtauville (FR); Frederic Duquet, Crespieres (FR)

(73) Assignee: APTAR FRANCE S.A.S., Le Neubourg (FR)

( * ) Notice: Subject to any disclaimer, the term of this patent is extended or adjusted under 35 U.S.C. 154(b) by 0 days.

(21) Appl. No.: 14/072,143

(22) Filed: Nov. 5, 2013

(65) Prior Publication Data

US 2014/0138409 A1 May 22, 2014

Related U.S. Application Data

(60) Provisional application No. 61/751,035, filed on Jan. 10, 2013.

(30) Foreign Application Priority Data

Nov. 22, 2012 (FR) ..................................... 12 61110

(51) Int. Cl.
*B65D 88/54* (2006.01)
*G01F 11/00* (2006.01)
*B65D 47/26* (2006.01)
*B05B 11/00* (2006.01)

(52) U.S. Cl.
CPC ........... *B65D 47/26* (2013.01); *B05B 11/3001* (2013.01); *B05B 11/3025* (2013.01); *B05B 11/3049* (2013.01)

(58) Field of Classification Search
CPC ........... B05B 11/3023; B05B 11/3001; B05B 11/3025; B05B 11/3049; B65D 47/26
USPC ................................ 222/321.2, 321.7–321.9
See application file for complete search history.

(56) References Cited

U.S. PATENT DOCUMENTS

| | | | | |
|---|---|---|---|---|
| 6,056,163 A * | 5/2000 | Lai | 222/321.2 |
| 6,209,759 B1 * | 4/2001 | Hermouet et al. | 222/321.2 |
| 7,281,644 B2 * | 10/2007 | Cater | 222/321.7 |
| 7,717,301 B2 * | 5/2010 | Tsai | 222/190 |
| 7,748,576 B2 * | 7/2010 | Tseng | 222/321.2 |
| 2002/0003150 A1 * | 1/2002 | Hermouet et al. | 222/321.2 |
| 2002/0134799 A1 | 9/2002 | Su | |
| 2012/0325862 A1 * | 12/2012 | Kuwahara et al. | 222/321.9 |
| 2013/0043278 A1 * | 2/2013 | Tu | 222/190 |

FOREIGN PATENT DOCUMENTS

| | | |
|---|---|---|
| FR | 2 343 137 A1 | 9/1977 |
| WO | 2011/093027 A1 | 8/2011 |

* cited by examiner

*Primary Examiner* — Patrick M Buechner
*Assistant Examiner* — Jeremy W Carroll
(74) *Attorney, Agent, or Firm* — Sughrue Mion, PLLC

(57) ABSTRACT

A fluid dispenser member, including a chamber and an outlet valve having an actuator rod that is axially movable down and up, and on which a sleeve slides, under the effect of a pre-compression spring and the pressure of the fluid, over a maximum axial stroke. The effective axial stroke of the sleeve is dependent on the force of the spring and the pressure of the fluid in the chamber. The actuator rod includes side outlet mechanism that is suitable for being closed and uncovered selectively by the sleeve, the side outlet mechanism extending over an axial height that is greater than their radial width.

20 Claims, 3 Drawing Sheets

FLUID DISPENSER MEMBER

CROSS REFERENCE TO RELATED APPLICATION

This application claims the benefit under 35 U.S.C. §119 (e) of U.S. provisional patent application Ser. No. 61/751,035, filed Jan. 11, 2013, and priority under 35 U.S.C. §119 (a)-(d) of French patent application No. FR-12 61110, filed Nov. 22, 2012.

TECHNICAL FIELD

The present invention relates to a fluid dispenser member, such as a pump, including a chamber in which the fluid is put under pressure, and an outlet valve through which the fluid under pressure is delivered from the chamber, the outlet valve comprising an actuator rod that is axially movable down and up, and on which a sleeve slides, under the effect of a pre-compression spring and the pressure of the fluid, over a maximum axial stroke, the effective axial stroke of the sleeve being dependent on the force of pre-compression spring and the pressure of the fluid in the chamber, the actuator rod including side outlet means that are suitable for being closed and uncovered selectively by the sleeve. Such a fluid dispenser member is frequently used in the fields of perfumery, cosmetics, and even pharmacy in order to dispense fluids, such as perfumes, creams, lotions, gels, pomades, etc.

BACKGROUND OF THE INVENTION

By way of example, a pump of this type is described in the prior art, in document FR 2 343 137. The sleeve that slides over the actuator rod is made integrally with the piston that slides in leaktight manner inside the pump body. In the rest position, the part forming the sleeve and the piston is urged by a return spring against a valve gasket. The actuator rod is urged into its rest position by a pre-compression spring that bears against the part forming the sleeve and the piston. The sleeve that slides over the actuator rod includes a piece of trim that, in the rest position, obstructs a side orifice in leaktight manner. The side orifice is merely in the form of a cylindrical hole of circular shape. Its diameter is about one tenth of a millimeter. With regard to the maximum stroke of the sleeve over the actuator rod, it is about one millimeter. Thus, the side orifice may be considered as an outlet that is localized compared to the maximum stroke of the sleeve over the actuator rod.

When the user presses on the pusher mounted on the free end of the actuator rod, said actuator rod is driven into the pump body and reduces the volume of the pump chamber. In response, the part forming the sleeve and the piston is urged, both by the pre-compression spring and by the increased pressure that exists in the pump chamber, in the direction opposite to the direction of the actuator rod, thereby causing the trim of the sleeve to uncover the side orifice of the actuator rod. Thus, the fluid put under pressure in the pump chamber finds an outlet passage through the side orifice from where it then flows into an internal channel inside the actuator rod as far as the pusher. This design is entirely conventional for a manual pre-compression pump in the fields of perfumery, cosmetics, and even pharmacy.

With such a pump, the quality and the form of the spray at the outlet from the nozzle of the pusher are constant, whatever the force exerted by the user on the pusher. The spray from the nozzle of the pusher is directly dependent on the stiffness of the return and pre-compression springs, and above all on the flow sections for the fluid from the pump chamber to the outlet from the nozzle. Thus, the single side-orifice of the actuator rod that acts as an outlet passage from the pump chamber, creates considerable head loss that is largely responsible for determining the quality and the nature of the spray. In other words, it can be said that it is the side orifice of the actuator rod alone that determines the form and the quality of the spray, assuming that the stiffnesses of the springs and the type of nozzle are constant parameters. As a result, regardless of whether the user presses gently or vigorously on the pusher, the fluid that passes through the side orifice of the actuator rod always presents physical characteristics that are constant in terms of quantity, flowrate, and pressure.

An object of the present invention is to vary the quality and the nature of the spray as a function of the intensity of the force exerted on the pusher. More precisely, the present invention seeks to create a spray that is light and long-lasting when the user presses gently on the pusher, and a spray that is powerful and short-lived when the user presses energetically on the pusher. Thus, the invention seeks to reproduce the dynamics with which the pusher is actuated in terms of the power, the configuration, and the duration of the spray. A direct correlation thus exists between the behavior of the user while actuating the pump, and the nature of the spray.

BRIEF SUMMARY OF THE INVENTION

In order to achieve these objects, the present invention proposes that the side outlet means of the actuator rod extend over an axial height that is greater than their radial width. When the side outlet means comprise a plurality of distinct side outlets that are separated axially, the axial height over which the side outlets extend is greater than the maximum radial width of the lowest side outlet that is uncovered first by the sleeve. When the side outlet means comprise a continuous side outlet that is axially elongate, the axial height over which the elongate outlet extends is greater than its maximum radial width.

Thus, the outlet from the pump chamber can no longer be likened to a localized outlet, as in the above-mentioned prior art document FR 2 343 137, but, on the contrary, the side outlet means present a dimension in the axial extent of the actuator rod. Thus, it can readily be understood that gentle and measured actuation of the pump moves the sleeve only over a fraction of the height of the side outlet means, thereby generating considerable head loss at the outlet from the pump chamber leading to a spray that is light and long-lasting. In contrast, rapid and vigorous actuation causes the sleeve to release the entire height of the side outlet means, thereby generating little head loss and leading to a spray that is powerful and short-lived. In other words, the more vigorously the pump is actuated, the greater the pressure inside the chamber, the greater the stroke of the sleeve over the actuator rod, and the greater the flow section for the fluid under pressure coming from the pump chamber.

In another definition for characterizing the configuration of the side outlet means, their axial height represents at least one fourth of the maximum axial stroke of the sleeve. Advantageously, the side outlet means of the actuator rod extend over an axial height that represents at least one half, possibly two thirds, or even all of the maximum axial stroke of the sleeve. The greater the extent to which the side outlet means extend over the axial height of the actuator rod, the more the user's actuation dynamics are reproduced in the spray.

In a first embodiment of the invention, the side outlet means comprise at least two distinct side outlets that are spaced apart axially, namely at least one bottom side outlet and at least one top side outlet. Each distinct side outlet may be considered as a localized outlet. However, since such localized outlets are spaced apart axially, gentle actuation causes only one side outlet to be uncovered, and vigorous actuation causes both side outlets to be uncovered. Advantageously, said at least one bottom side outlet presents a flow section that is smaller than the flow section of said at least one top side outlet. Thus, a user's actuation dynamics are amplified given that gentle actuation releases only the bottom side outlet of small section, while vigorous actuation releases both side outlets presenting a combined flow section that more than twice the flow section of the bottom side outlet. In another aspect of the invention, the actuator rod forms an outlet duct downstream from each side outlet. This ensures there is no head loss for the fluid inside the actuator rod, thereby conserving the physical characteristics of the fluid as far as the pusher. In a practical embodiment, the actuator rod forms an outlet duct downstream from each side outlet, the outlet duct that is associated with the bottom side outlet presenting a flow section that is smaller than the flow section of the outlet duct that is associated with the top side outlet. Thus, in terms of flow section, each respective outlet duct is adapted to its respective side outlet, so as to conserve the head loss all the way along the actuator rod as far as the pusher.

In a second advantageous embodiment of the invention, the side outlet means comprise at least one continuous side outlet that is axially elongate. It can also be said that the elongate continuous side outlet presents an axial dimension that is considerably greater than its circumferential dimension. In other words, the elongate continuous side outlet extends further over the height of the actuator rod than over its periphery. It is possible to imagine any kind of configuration for the elongate continuous side outlet. For example, the elongate continuous side outlet may present a section that is constant over its height. In contrast, the elongate continuous side outlet may present a section that varies over its height. By way of example, provision may be made for the flow section of the elongate continuous side outlet to increase in linear manner, with or without steps, or even in exponential manner. The shape of the side outlet thus constitutes a more or less complex function for transforming the actuation of the pump into a spray profile.

According to another characteristic of the invention, the side outlet means may communicate downstream with a common outlet duct formed by the actuator rod.

The spirit of the invention resides in imparting an axial dimension to the outlet from the pump chamber, making it possible to reproduce, more or less faithfully, the actuation dynamics of the dispenser member in terms of spray profile or configuration at the outlet from the nozzle of the pusher. This applies whatever the configuration of the side outlet means (a plurality of outlets spaced apart axially, or a single elongate outlet). The principle could be summarized as follows: the flow section of the outlet from the pump chamber increases with increasing pressure inside the pump chamber. In terms of use, the outlet flow section from the pump chamber increases with increasing pressure applied on the pusher. The expression "side outlet means" is used in the claims to encompass both a plurality of distinct side outlets, and a single continuous side outlet that is axially elongate.

BRIEF DESCRIPTION OF THE DRAWINGS

The invention is described more fully below with reference to the accompanying drawings, which show several embodiments of the invention by way of non-limiting example.

In the figures.

DETAILED DESCRIPTION

Figure 1:
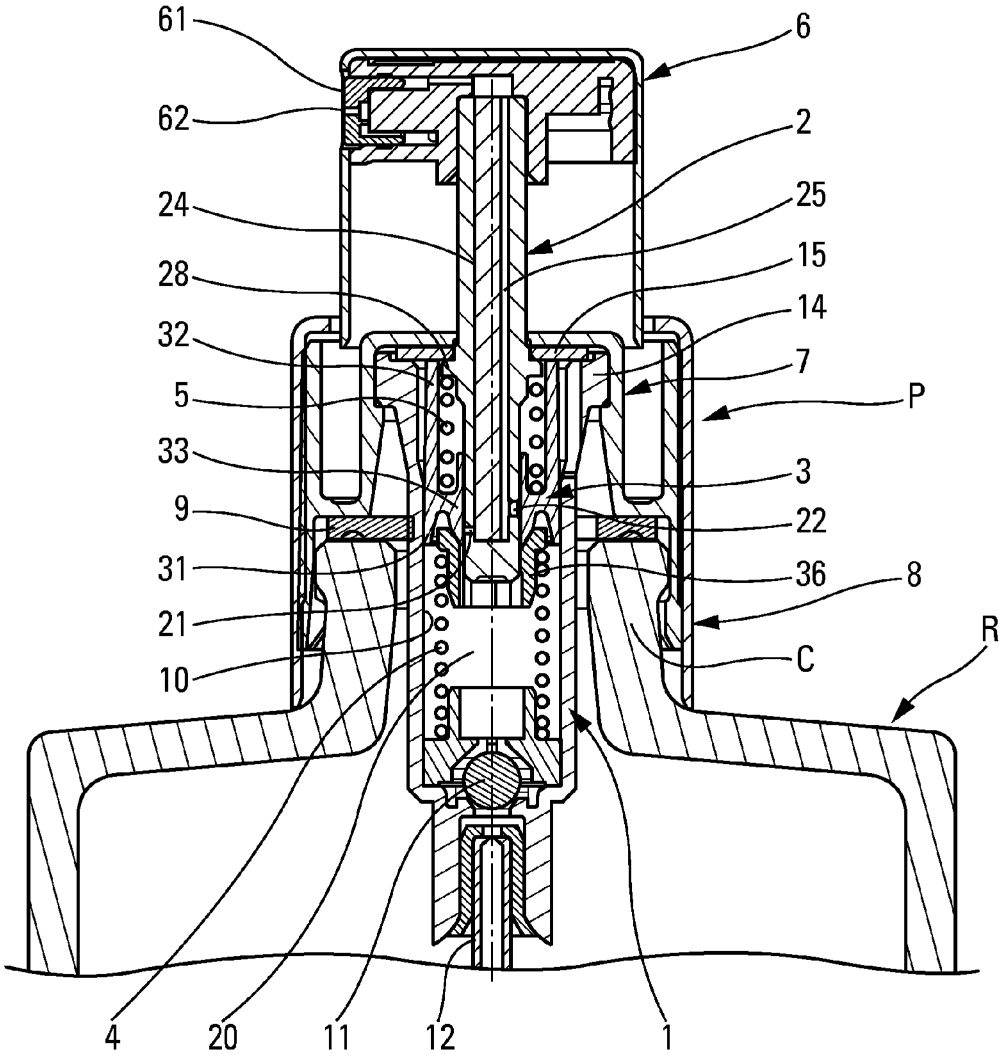
FIG. 1 is a vertical section view through a dispenser made in accordance with a first embodiment of the invention.

Reference is made firstly to FIG. 1 in order to describe in detail the structure of a dispenser member in a first embodiment of the invention. In this embodiment, the dispenser member is a manually-actuated pump that is shown in a mounted configuration on a fluid reservoir R provided with a projecting neck C. The pump comprises a pump body 1 that internally defines a slide cylinder 10 for a piston, as described below. At its bottom end, the pump body 1 is provided with an inlet valve 11, e.g. in the form of a ball resting in leaktight and selective manner on an appropriate seat. Below the inlet valve, the pump body is connected, in conventional manner, to a dip tube 12 that extends into the proximity of the bottom wall of the reservoir R. At its opposite end, the pump body 1 forms a collar 14 with which there is associated a fastener ring 7 that makes it possible to fasten the pump body around the neck C of the reservoir R. By way of example, the fastener ring 7 may co-operate with a blocking and covering hoop 8 that makes it possible to block a portion of the ring 7 around the neck C. The fastener ring 7 also makes it possible to compress a neck gasket 9 against the top annular edge of the neck C. The fastener ring 7 also makes it possible to hold a valve gasket 15 in place at the collar 14.

The dispenser member also includes an actuator rod 2 that is axially movable down and up inside the pump body 1, so as to cause the volume of a pump chamber 20 to vary. The actuator rod 2 includes an annular reinforcement 28 that comes into abutment in the rest position below the valve gasket 15. The reinforcement 28 also serves as a bearing surface for a pre-compression spring 5 that extends around the actuator rod 2. The pre-compression spring 5 also bears against a movable part 3 that defines a piston lip 31 in sliding sealing contact with the slide cylinder 10 of the pump body, an abutment bushing 32 that comes into abutment in the rest position against the valve gasket 15, and a sleeve 33 that slides in leaktight manner around the actuator rod 2. The movable part 3 is also urged by a return spring 4 that bears against a ring 36 that is constrained to move with the movable part 3. The ring 36 may contribute to improving the sealing of the sleeve 33 against the actuator rod 2 in the rest position.

In the invention, the actuator rod 2 includes side outlet means that, in this embodiment, are in the form of two distinct side outlets, namely a bottom side outlet 21 and a top side outlet 22 that are axially offset relative to each other. In FIG. 1, it should even be observed that the bottom and top side outlets 21 and 22 are arranged in diametrally-opposite manner. However, they could alternatively be arranged axially one above the other. By way of example, the two side outlets may be in the form of circularly-cylindrical orifices. However, the flow section of the bottom side outlet 21 may be smaller than the flow section of the top side outlet 22. Each of the two outlets 21 and 22 presents a maximum radial width, and extends over an axial height that corresponds to their axial offset plus their respective diameters. The axial height is greater than the maximum radial width of the bottom side outlet 21.

In the rest position, as shown in FIG. 1, the two side outlets 21 and 22 are masked and obstructed by the sleeve 33. The actuator rod 2, with its side outlets 21, 22, and the sleeve 33 co-operate with each other to form an outlet valve for the pump chamber 20. In addition, the actuator rod 2 defines two outlet ducts 24 and 25 each communicating with a respective side outlet. More precisely, the outlet duct 24 extends downstream from the bottom side outlet 21, while the outlet duct 25 extends downstream from the top side outlet 22. In an advantageous embodiment, the flow section of the outlet duct 24 is smaller than the flow section of the outlet duct 25. Thus, the head loss created at the bottom side outlet 21 is conserved all the way along the outlet duct 24. The same applies for the side outlet 22.

The free end of the actuator rod 2 is covered by a pusher 6 that is provided with a nozzle 61 that forms a spray orifice 62. By pressing on the pusher 6, the actuator rod is moved axially in the pump body 1.

Figures 2A, 2B, 2C:
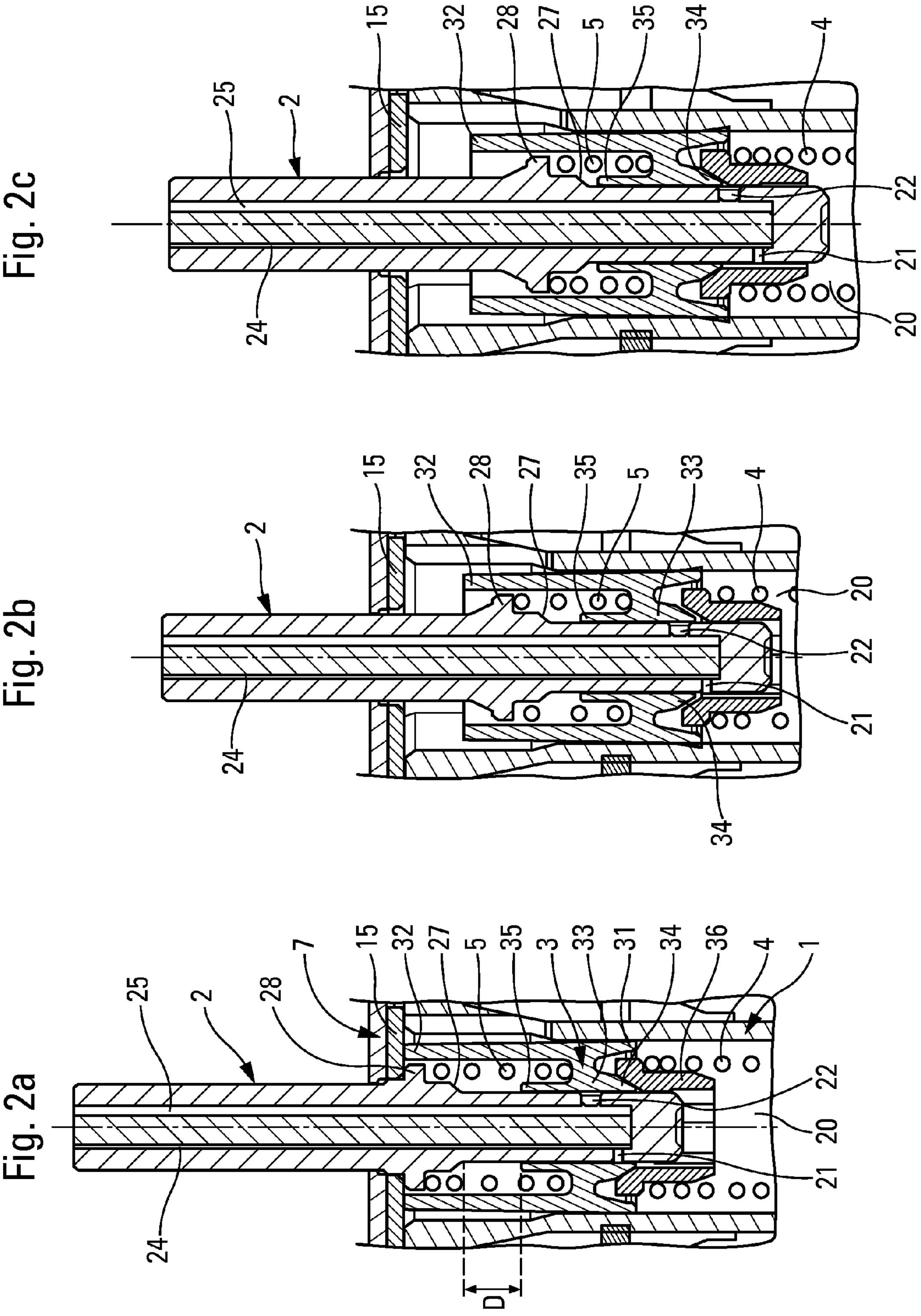
FIGS. 2*a*, 2*b*, and 2*c* show various operating configurations of the FIG. 1 dispenser.

Reference is made below successively to FIGS. 2*a*, 2*b*, and 2*c* in order to describe various configurations of the FIG. 1 dispenser member.

In FIG. 2*a*, the pump is at rest, which means that the annular reinforcement 28 is in abutment against the valve gasket 15, and the abutment bushing 32 is in abutment against the same valve gasket 15. The two side outlets 21 and 22 are masked by the sleeve 33. In FIG. 2*a*, it can be seen that the maximum stroke of the sleeve 33 corresponds to a distance D that separates the top end 35 of the sleeve 33 from a frustoconical surface 27 that is formed by the actuator rod below the annular reinforcement 28. In other words, the sleeve 33 may move from the position shown in FIG. 2*a* until its top end 35 is in abutment against the frustoconical surface 27.

In FIG. 2*b*, the pump is shown in an actuated or depressed position, the annular reinforcement 28 and the abutment bushing 32 being separated from the valve gasket 15. The pressure inside the pump chamber 20 is greater than the force of the pre-compression spring 5 such that the bottom end 34 of the sleeve 33 moves and uncovers the bottom side outlet 21. Thus, the fluid under pressure in the pump chamber 20 finds an outlet passage through the bottom side outlet 21, then through the outlet duct 24. It can clearly be observed that the sleeve 33 has not performed its maximum stroke D, since its top end 35 is separated from the frustoconical surface 27. This actuation configuration corresponds to gentle and prolonged actuation that makes it possible to generate medium pressure inside the pump chamber. In response, the sleeve 33 moves over a medium stroke that makes it possible to uncover the bottom side outlet 21 only, the top side outlet 22 still being masked and closed by the sleeve 33. It can readily be understood that the fluid put under pressure in the pump chamber is subjected to a considerable amount of head loss while it is passing through the bottom side outlet 21. At the spray orifice 62, this results in a spray that is moderate in quantity and in intensity, but that is of prolonged duration.

In FIG. 2*c*, it should be observed that both side outlets 21 and 22 are uncovered, such that the fluid from the pump chamber 20 is subjected to little head loss, not only because there are two side outlets, but also because the top side outlet 22 presents a larger flow section than the bottom side outlet 21. The fluid may thus flow through both outlet ducts 24, 25 of the actuator rod as far as the nozzle of the pusher, so as to form a spray that is intense, but that is short-lived.

Whatever the actuation dynamics of the rod 2, the quantity of fluid that is dispensed remains constant, only its intensity and its duration vary. When the sleeve 33 moves little, only the bottom side outlet 21 is uncovered, and the fluid from the pump chamber takes longer to be evacuated, which implies forming a spray of low intensity and long duration. In contrast, when the sleeve moves further over the actuator rod 2, both side outlets are uncovered and the fluid of the pump chamber is evacuated quickly, thus generating a spray that is powerful, but short-lived.

Figure 3:
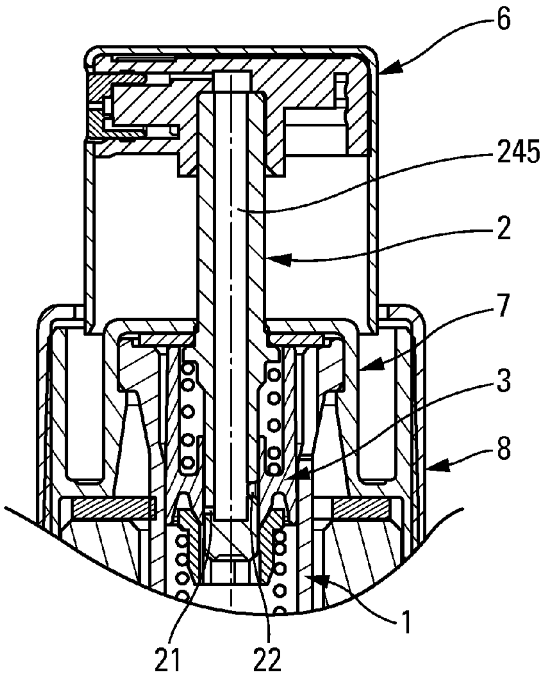
FIG. 3 is a view substantially similar to the view in FIG. 1 for a variant embodiment.

Reference is made to FIG. 3 which shows a variant embodiment in which the actuator rod defines a single outlet channel 245 that is common to both side outlets 21 and 22. The single outlet channel 245 is easier to make by means of a conventional pin. In contrast, when the actuator rod 2 defines two or more outlet channels, conventional molding by means of a pin turns out to be complicated. In this configuration, other manufacturing techniques are possible, such as by laser milling, for example, or even by inserting a profiled bar into the actuator rod.

Figures 4, 5, 6, 7:
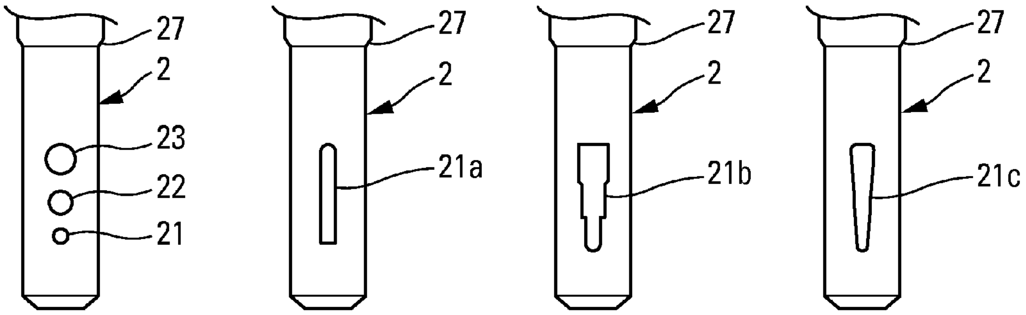
FIGS. 4, 5, 6, and 7 are diagrams showing several other embodiments of the invention.

Reference is made below to FIGS. 4 to 7 in order to describe various possible geometrical configurations for the side outlet means of the actuator rod 2. In FIG. 4, the side outlet means are in the form of three orifices 21, 22, and 23 of increasing flow sections, e.g. in the shape of circularly-cylindrical holes. In FIG. 5, the side outlet means 21*a* are in the form of a single or continuous outlet that is axially elongate. In other words, the single outlet presents an axial height that is greater than its maximum radial width. The side outlet 21*a* may be in the form of a slot presenting parallel edges with a constant offset, such that its section is constant over its entire height. In FIG. 6, the side outlet 21*b* is a variant of the FIG. 5 embodiment, since it has three increasing flow sections. The edges of this particular slot are parallel, but move apart progressively in steps. In FIG. 7, the side outlet is also continuous and axially elongate, and is in the form of an elongate triangle having a point that is oriented downwards. It may be considered as being a smooth version of the outlet 21*b* in FIG. 6.

As a result of their geometrical configurations, the side outlet means in FIGS. 4, 6, and 7 present flow sections that increase exponentially, while the slot in FIG. 5 presents a flow section that increases linearly. The side outlet means in FIGS. 4 and 6 imply stepped behavior, while the side outlet means in FIGS. 5 and 7 produce progressive behavior.

In all of the embodiments, the side outlet means 21, 22, 23, 21*a*, 21*b*, and 21*c* extend over an axial height of the actuator rod 2 that corresponds to a significant fraction of the maximum axial stroke D of the sleeve. It is recommended to use an axial height that corresponds to at least one fourth of the maximum axial stroke D of the sleeve, if not one half, two thirds, three fourths, or even all of the maximum axial stroke D of the sleeve. It is also possible to define the configuration of the side outlet means as having an axial height that is greater than their radial or circumferential width. Whatever the configuration, the axial extent of the side outlet means is such that they cannot be likened to a localized outlet that would imply binary behavior for the pump: on the contrary, the side outlet means lead to dynamic behavior that reflects the dynamics with which the pump is actuated. The axial height of the side outlet means is defined above as a function of the maximum stroke D of the sleeve, but it is also possible to define the axial height as a function of the diameter of the actuator rod. It could thus be said that the axial height of the side outlet means corresponds to at least one half of the diameter of the actuator rod 2. A range of 0.5 to 2 times, and preferably a range of 1 to 2 times, the diameter of the actuator rod 2 makes it possible to cover the axial heights necessary for the invention.

By means of the invention, it is possible to obtain a dispenser member, and more particularly a pump, delivering a spray of shape, intensity, and duration that reflect the dynamics with which the pusher is actuated.

What is claimed is:

1. A fluid dispenser member, including a chamber in which the fluid is put under pressure, and an outlet valve through which the fluid under pressure is delivered from the chamber, the outlet valve comprising an actuator rod that is axially movable down and up, and on which a sleeve slides, under the effect of a pre-compression spring and the pressure of the fluid, over a maximum axial stroke, the effective axial stroke of the sleeve being dependent on the force of the pre-compression spring and the pressure of the fluid in the chamber, the actuator rod coupled to a pusher that is provided with a nozzle that forms a spray orifice, so that by pressing on the pusher, the actuator rod is moved axially down and up, the actuator rod including side outlet means suitable for being closed and uncovered selectively by the sleeve, wherein the side outlet means of the actuator rod comprise at least two distinct side outlets that are spaced apart axially, namely at least one bottom side outlet and at least one top side outlet, the bottom side outlet presenting a maximum radial width, the side outlet means extending over an axial height that is greater than the maximum radial width of the bottom side outlet, resulting in a variation in spray depending on an actuation force exerted on the pusher.

2. The dispenser member according to claim 1, wherein the axial height of the side outlet means represents at least one fourth of the maximum axial stroke of the sleeve.

3. The dispenser member according to claim 1, wherein the side outlet means of the actuator rod extend over an axial height that represents at least one half of the maximum axial stroke of the sleeve.

4. The dispenser member according to claim 1, wherein said at least one bottom side outlet presents a flow section that is smaller than a flow section of said at least one top side outlet.

5. The dispenser member according to claim 4, wherein the actuator rod forms an outlet duct downstream from each side outlet.

6. The dispenser member according to claim 1, wherein the actuator rod forms an outlet duct downstream from each side outlet.

7. The dispenser member according to claim 6, wherein the outlet duct that is associated with the bottom side outlet presents a flow section that is smaller than the flow section of the outlet duct that is associated with the top side outlet.

8. The dispenser member according to claim 1, wherein the side outlet means communicate downstream with a common outlet duct formed by the actuator rod.

9. The dispenser member according to claim 1, wherein the actuator rod presents a diameter at the side outlet means, the axial height of the side outlet means lying in the range 0.5 to 2 times the diameter of the actuator rod.

10. The dispenser member according to claim 1, wherein the dispenser member is a pump.

11. The dispenser member according to claim 1, wherein the side outlet means of the actuator rod extend over an axial height that represents two thirds of the maximum axial stroke of the sleeve.

12. The dispenser member according to claim 1, wherein the side outlet means of the actuator rod extend over an axial height that represents all of the maximum axial stroke of the sleeve.

13. The dispenser member according to claim 1, wherein the actuator rod has a diameter at the side outlet means, the axial height of the side outlet means lying in the range of 1 to 2 times the diameter of the actuator rod.

14. A fluid dispenser member, including a chamber in which the fluid is put under pressure, and an outlet valve through which the fluid under pressure is delivered from the chamber, the outlet valve comprising an actuator rod that is axially movable down and up, and on which there slides a sleeve, under the effect of a pre-compression spring and the pressure of the fluid, over a maximum axial stroke, the effective axial stroke of the sleeve being dependent on the force of the pre-compression spring and the pressure of the fluid in the chamber, the actuator rod coupled to a pusher that is provided with a nozzle that forms a spray orifice, so that by pressing on the pusher, the actuator rod is moved axially down and up, the actuator rod including side outlet means that are suitable for being closed and uncovered selectively by the sleeve, wherein the side outlet means of the actuator rod comprise at least one continuous side outlet that is axially elongate and that presents a maximum radial width, the axially-elongate continuous side outlet extending over an axial height that is greater than its maximum radial width, resulting in a variation in spray depending on an actuation force exerted on the pusher.

15. The dispenser member according to claim 14, wherein the elongate continuous side outlet has a horizontal cross-section that is constant over its height.

16. The dispenser member according to claim 14, wherein the elongate continuous side outlet has a horizontal cross-section that varies over its height.

17. The dispenser member according to claim 14, wherein the dispenser member is a pump.

18. The dispenser member according to claim 14, wherein the axial height of the side outlet means represents at least one fourth of the maximum axial stroke of the sleeve.

19. A fluid dispenser member, comprising:

a chamber in which fluid is put under pressure;

an outlet valve through which the fluid under pressure is delivered from the chamber, the outlet valve comprises an actuator rod that is axially movable down and up; and a sleeve that slides on the actuator rod under the effect of a pre-compression spring and the pressure of the fluid, over a maximum axial stroke, the effective axial stroke of the sleeve being dependent on the force of the pre-compression spring and the pressure of the fluid in the chamber, the actuator rod coupled to a pusher, so that by pressing on the pusher, the actuator rod is moved axially down and up; and wherein the actuator rod comprises at least one of:

(1) side outlets that are closed and opened selectively by the sleeve, the side outlets comprises at least two distinct side outlets that are spaced apart axially along the actuator rod, including a bottom side outlet and a top side outlet, the bottom side outlet having a maximum radial width, the side outlets extending over an axial height that is greater than the maximum radial width of the bottom side outlet; or (2) a continuous side outlet that is axially elongate and that presents a maximum radial width, the axially-elongate continuous side outlet extending over an axial height that is greater than its maximum radial width;

said at least one of the side outlets or the continuous side outlet providing a spray of the fluid that is variable depending on an actuation force exerted on the pusher, wherein the sleeve is slidable along an axial direction of the pump chamber.

20. The dispenser member according to claim 19, wherein the side outlets or the continuous side outlet are arranged so that the quantity of fluid that is dispensed remains constant while the fluid is dispensed with an intensity and duration that varies depending on the actuation dynamics of the actuator rod.

* * * * *